US010699293B2

(12) United States Patent
Chen

(10) Patent No.: US 10,699,293 B2
(45) Date of Patent: Jun. 30, 2020

(54) NETWORK BASED SYSTEM AND METHOD FOR MANAGING AND IMPLEMENTING ONLINE COMMERCE

(75) Inventor: James Chen, San Francisco, CA (US)

(73) Assignee: RAKUTEN MARKETING LLC, New York, NY (US)

( * ) Notice: Subject to any disclaimer, the term of this patent is extended or adjusted under 35 U.S.C. 154(b) by 915 days.

(21) Appl. No.: 12/900,098

(22) Filed: Oct. 7, 2010

(65) Prior Publication Data

US 2012/0089454 A1    Apr. 12, 2012

(51) Int. Cl.
*G06Q 30/02* (2012.01)

(52) U.S. Cl.
CPC ..... *G06Q 30/0243* (2013.01); *G06Q 30/0201* (2013.01); *G06Q 30/0249* (2013.01)

(58) Field of Classification Search
None
See application file for complete search history.

(56) References Cited

U.S. PATENT DOCUMENTS

| | | |
|---|---|---|
| 4,941,090 A | 7/1990 | McCarthy |
| 5,117,355 A | 5/1992 | McCarthy |
| 5,202,826 A | 4/1993 | McCarthy |
| 5,319,542 A | 6/1994 | King, Jr. |
| 5,537,314 A | 7/1996 | Kanter |
| 5,590,197 A | 12/1996 | Chen |
| 5,692,206 A | 11/1997 | Shirley |
| 5,708,780 A | 1/1998 | Levergood |
| 5,710,884 A | 1/1998 | Dedrick |
| 5,712,979 A | 1/1998 | Graber |
| 5,715,314 A | 2/1998 | Payne |
| 5,715,315 A | 2/1998 | Handelman |
| 5,717,860 A | 2/1998 | Graber |
| 5,724,424 A | 3/1998 | Gifford |
| 5,745,681 A | 4/1998 | Levine |
| 5,796,952 A | 8/1998 | Davis |
| 5,812,769 A | 9/1998 | Graber |
| 5,819,285 A | 10/1998 | Damico |
| 5,848,396 A | 12/1998 | Gerace |
| 5,855,008 A | 12/1998 | Goldhaber |
| RE36,116 E | 2/1999 | McCarthy |
| 5,873,076 A | 2/1999 | Barr |
| 5,937,392 A | 8/1999 | Alberts |

(Continued)

OTHER PUBLICATIONS

International Search Report PCT/US11/55421.

*Primary Examiner* — Michael J Sittner
(74) *Attorney, Agent, or Firm* — Troutman Sanders LLP

(57) ABSTRACT

The disclosed computer system provides a selectively programmed Web architecture that implements a procedure and method for selectively serving to a Web page one or more electronic ads wherein the selection process is governed in part by application of a statistical algorithm. In a preferred embodiment of the inventive technology, the system manages and serves electronic ads for affiliated Web page publishers and advertisers. A computer-implemented method in accordance with the disclosed technology receives a request for an electronic advertisement for a Web page, wherein the Web page is associated with a Web page publisher, one or more electronic ads are selected using a statistics based approach, and the one or more electronic ads are communicated to the Web page for display.

6 Claims, 15 Drawing Sheets

(56) References Cited

U.S. PATENT DOCUMENTS

| | | |
|---|---|---|
| 5,948,016 A | 9/1999 | Jang |
| 5,948,061 A | 9/1999 | Merriman |
| 5,991,735 A | 11/1999 | Gerace |
| 5,991,740 A | 11/1999 | Messer |
| 5,999,914 A | 12/1999 | Blinn |
| 6,006,197 A | 12/1999 | d'Eon |
| 6,016,504 A | 1/2000 | Arnold |
| 6,029,141 A | 2/2000 | Bezos |
| 6,041,309 A | 3/2000 | Laor |
| 6,047,327 A | 4/2000 | Tso |
| 6,055,513 A | 4/2000 | Katz |
| 6,141,666 A | 10/2000 | Tobin |
| 6,173,271 B1 | 1/2001 | Goodman |
| 6,226,618 B1 | 5/2001 | Downs |
| 6,240,455 B1 | 5/2001 | Kamasaka |
| 6,285,987 B1 | 9/2001 | Roth et al. |
| 6,804,660 B2 | 10/2004 | Landau |
| 6,826,594 B1 | 11/2004 | Pettersen |
| 7,043,471 B2 * | 5/2006 | Cheung et al. |
| 7,505,913 B2 | 3/2009 | Tobin |
| 2001/0034646 A1 | 10/2001 | Hoyt |
| 2001/0037205 A1 | 11/2001 | Joao |
| 2002/0042739 A1 | 4/2002 | Srinivasan |
| 2002/0055911 A1 | 5/2002 | Guerrieri |
| 2003/0236701 A1 | 12/2003 | Rowney |
| 2004/0260657 A1 | 12/2004 | Cockerham |
| 2006/0149686 A1 | 7/2006 | Debonnett |
| 2006/0190328 A1 * | 8/2006 | Singh et al. .................... 705/14 |
| 2006/0212350 A1 | 9/2006 | Ellis et al. |
| 2007/0033103 A1 * | 2/2007 | Collins .............. G06Q 30/0241 705/14.41 |
| 2007/0219865 A1 | 9/2007 | Leining |
| 2008/0086555 A1 | 3/2008 | Feinleib |
| 2008/0097843 A1 * | 4/2008 | Menon et al. ................... 705/14 |
| 2008/0103952 A1 * | 5/2008 | Flake ..................... G06Q 30/02 705/37 |
| 2008/0120156 A1 | 5/2008 | Nusbaum |
| 2008/0243601 A1 * | 10/2008 | Patel et al. ....................... 705/14 |
| 2009/0012905 A1 * | 1/2009 | Mawani ................ G06Q 30/02 705/1.1 |
| 2009/0319368 A1 * | 12/2009 | Reardon et al. ........... 705/14.51 |
| 2010/0036703 A1 * | 2/2010 | Chen et al. ....................... 705/8 |
| 2010/0082433 A1 * | 4/2010 | Zhou et al. ................. 705/14.54 |
| 2010/0082439 A9 * | 4/2010 | Patel ..................... G06Q 30/02 705/14.72 |
| 2010/0145762 A1 | 6/2010 | Coladonato et al. |
| 2010/0235243 A1 * | 9/2010 | Hecht ..................... G06Q 30/02 705/14.71 |
| 2010/0274663 A1 * | 10/2010 | Hinton ................... G06Q 30/02 705/14.43 |
| 2011/0047031 A1 * | 2/2011 | Weerasinghe ......... G06Q 30/02 705/14.66 |
| 2011/0213655 A1 * | 9/2011 | Henkin .............. G06Q 30/0251 705/14.49 |
| 2011/0282730 A1 * | 11/2011 | Tarmas .............. G06Q 30/0241 705/14.42 |

\* cited by examiner

Quick Stats

| Select Period | Yesterday |
|---|---|
| Activities | |
| Impressions | 891,011 |
| Clicks | 89,982 |
| Transactions | 891,011 |
| Unique Publishers | 467 |
| Performance | |
| Gross Sales | $49,833.45 |
| Gross Commission | $1,732.62 |
| Network | |
| Publishers | 321 |
| Active Offers | 28 |

Figure 5

| Quick Stats | |
|---|---|
| Select Period | Yesterday |
| Activities | |
| Impressions | 891,011 |
| Clicks | 89,982 |
| Transactions | 891,011 |
| Unique Publishers | 497 |
| Performance | |
| Gross Sales | $49,533.45 |
| Gross Commission | $1,732.82 |
| Network | |
| Publishers | 321 |
| Active Offers | 29 |

NETWORK BASED SYSTEM AND METHOD FOR MANAGING AND IMPLEMENTING ONLINE COMMERCE

FIELD OF THE INVENTION

The present invention relates generally to electronic advertisements, and more specifically, to a networked based computer system and method for implementing performance enhancing protocols and system architecture to facilitate Web based commerce.

BACKGROUND OF THE INVENTION

As the Internet and World Wide Web continue to expand, and as increasing numbers of households and businesses join the online marketplace, opportunities for advertisers and consumers to reach each other will continue to increase. The environment of electronic commerce involves challenges and advantages different from those of a physical marketplace. This is especially true in the area of advertising.

Electronic advertising in the Internet marketplace is vastly different from paper advertisements (ads) in the physical marketplace in many ways. One significant difference is that electronic commerce is not bounded by physical proximity; once there is access to the Internet, there is also access to the entire Internet marketplace. Thus, the audience for electronic advertising potentially can be the entire online population. Another difference is that participants in electronic commerce have the ability to electronically gather various types of information, such as market research without marketplace or consumer surveys. Thus, certain manpower costs and delay associated with advertising in the physical marketplace are reduced or non-existent in the electronic marketplace.

On the other hand, the differences of the Internet marketplace also present challenges for electronic advertising. Electronic advertising involves technological competence and equipment that interested market participants may not possess. Accordingly, there is continued interest in further developing and improving various aspects of electronic advertising and of the Internet marketplace to address these and other challenges.

OBJECTS AND SUMMARY OF THE INVENTION

It is therefore an object of the present invention to provide a network based computer system with an access portal for bringing various commerce participants together in a network communication environment and preferably, a Web based network with the access portal linked to a commerce support platform.

It is another object of the present invention to provide a promotion protocol for optimizing the access and distribution of online advertising.

It is yet another object of the present invention to provide an optimizing algorithm for supporting promotions on the Web using past advertising performance as a qualifying parameter in pricing/implementing commerce on the Web.

The above and other objects of the present invention are realized in a specific illustrative embodiment thereof that comprises a selectively programmed computer platform and system connected to the Web. An Ad Clearinghouse computer is network linked to plural remote computer servers to act as a meeting place for publishers and advertisers (such as merchants).

An advertiser will specify their advertisement criteria or rules, and a publisher must accept these rules to advertise for the advertiser. Before the present invention, this task was increasingly tedious as the network grew. In a preferred embodiment of the present invention, a publisher will indicate available advertisement units or locations on their Web page available for ads, and all advertisers are automatically authorized to display their ads on the publisher's Web page.

This automatic "greenlighting" of all advertisers obviates much of the hassle of manually managing Web site advertising. In a preferred embodiment, the publisher will have the ability to add advertisers to a blacklist, so that ads from these advertisers will not be published on their Web page. For example, a Web site for children's education may not want adult material to be advertised on their Web site.

The disclosed computer system provides a selectively programmed Web architecture that implements a procedure and method for selectively serving to a Web page one or more electronic ads wherein the selection process is governed in part by application of a statistical algorithm. In one aspect of the inventive technology, the system manages and serves electronic ads for affiliated Web page publishers and advertisers. A computer-implemented method in accordance with the disclosed technology receives a request for an electronic advertisement for a Web page, wherein the Web page is associated with a Web page publisher, one or more electronic ads are selected using a statistics based approach, and the one or more electronic ads are communicated to the Web page for display.

The disclosed advertisement optimization differs from other methods presently found in the art. For example, Google™ Adsense™ optimizes its advertising by displaying ads that are contextually related to the Web page that the ads are being displayed on, such as dog food ads on a blog dedicated to dogs. Another advertising method, which is becoming increasingly popular, is retargeting. Systems that utilize retargeting view cookie information to see which Web sites the user has previously visited, and display ads based off of this information. For example, while a user is on a Web site for widgets, a retargeting system may find a cookie associated with a user's previous visit to a blog dedicated to dogs, and display a dog food advertisement or an advertisement for that same dog blog, based on this information. Similarly, behavioral advertising makes use of an internet user's browsing habits, search queries and Web site history. All of these systems, however, are based on the user or publishing Web site, as opposed to the statistical record of the advertisement itself. The present optimization system, on the other hand, is driven substantially by the performance of the advertisement.

Other features and advantages of the invention will become more apparent when considered in connection with the accompanying drawings and detailed description.

BRIEF DESCRIPTION OF THE DRAWINGS

In the drawings:

FIGS. 3-12 are screen shots of illustrative embodiments.

DETAILED DESCRIPTION

The disclosed technology provides a computer platform and system, and architecture that supports a selectively programmed processing method for providing to a Web page one or more electronic ads selected using a statistics based approach. Various aspects of the disclosed technology also relate to tracking of electronic advertisement "impressions" to use in post processing calculations. The term "impressions" defines the number of times that an electronic advertisement is displayed on a user's screen. Other aspects of the disclosed technology relate to tracking of "clicks" as a measured performance parameter. In this context a "click" is a user selecting an on screen ad. Still other aspects of the disclosed technology relate to tracking of "sales" linked to a particular ad-location combination. Sales can be measured in several different ways. One simply involves the amount of the sales generated by a displayed advertisement. Another aspect of the disclosed technology is the system for facilitating the interaction between Web page publishers and those wishing to advertise. The particular embodiments described herein are exemplary and do not limit the scope of the disclosed technology.

Figure 1:
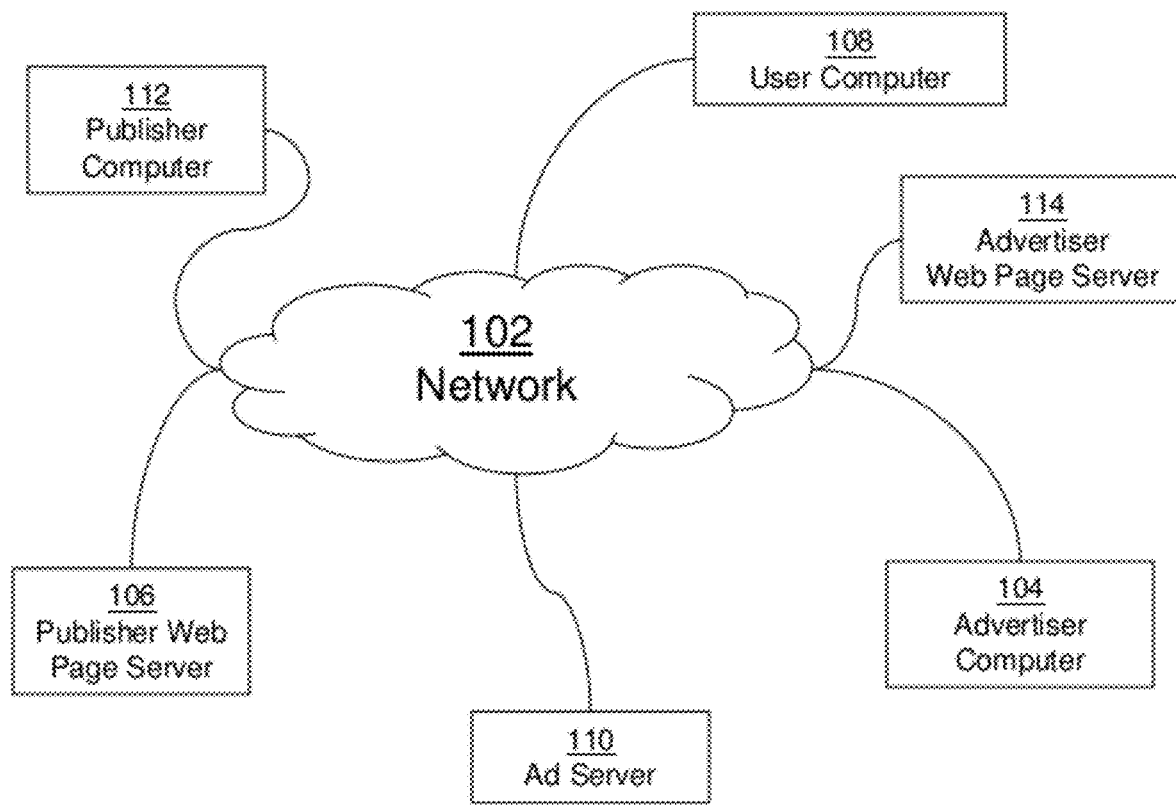
FIG. 1 is a block diagram illustrating an exemplary Internet marketplace, its participants, and associated equipment, in accordance with one embodiment of the disclosed technology.

Referring now to FIG. 1, there is shown a block diagram of one embodiment of an Internet marketplace infrastructure 100 in accordance with the disclosed technology. The Internet marketplace infrastructure 100 includes a network 102 that may include one or more telecommunication devices such as routers, hubs, gateways, and the like, as well as one or more connections such as wired connections or wireless connections. In different embodiments, the network 102 can include different numbers of telecommunication devices and connections and can span a range of different geographies. In different embodiments, the network 102 can include, among other things, all or portions of a wired telephone infrastructure, a cellular telephone infrastructure, a cable television infrastructure, and/or a satellite television infrastructure.

Various Internet marketplace participants are in communication with the network 102, including one or more Publisher Web page servers 106, one or more Advertiser Web Page servers 114 and user computers 108. As used herein, the term "computer" includes any system or device that can execute machine instructions, including, for example, desktops, laptops, servers, cell phones, smart phones, handheld devices, television set top boxes, and/or networked computing systems, or multiples or combinations thereof. The Web page servers 106 and 114 include Web pages and Web server software that can provide the Web pages to systems or devices requesting them. The Web pages can include a myriad of different media and content, including, for example, a search interface, shopping content, news content, video or audio content, and/or animations, among others.

In accordance with one aspect of the disclosed technology, and with continuing reference to FIG. 1, the Internet marketplace infrastructure 100 also includes an electronic advertisement server ("Ad server") 110, an advertiser computer 104 and a publisher computer 112 that are in communication with the network 102. As used herein, an "advertiser" is a person or entity that wants to advertise with electronic ads. Advertisers may be, for example and not by way of limitation, merchants selling products or services. A "publisher" is a person or entity that owns or operates one or more Web pages that is capable of displaying electronic advertisements. A party may be both an advertiser and a publisher. In an exemplary arrangement, advertisers pay publishers to display or publish ads on their Web page. Payments from advertisers to publishers may be based on any payment scheme known in the art, such as: cost per impressions (CPM), where publishers are paid based on the number of ads displayed; cost per click (CPC), where publishers are paid based on the number of ads that are clicked on; or cost per action (CPA), where publishers are paid based on specified actions taken after a user clicks the ad such as registering for a website or based on the sales generated by an advertisement—usually a percentage of any purchase resulting from the click-through. Alternatively, payments may be based on a combination of these payment schemes.

Advertiser computer 104 is a computer used by an advertiser, and publisher computer 112 is a computer used by a publisher. Computers 104 and 112 can be used to access Ad server 110, also referred to as the Ad Clearinghouse, in order to create or modify affiliate advertising relationships.

The Publisher Web page server 106, Advertiser Web page server 114, user computer 108, Ad server 110, advertiser computer 104, and publisher computer 112 can each include hardware such as network communication devices, non-transitory storage medium/devices, processors, memory, and software such as operating system software, Web server software, and/or Web browsing software. In one embodiment, the user computer 108 includes a Web browser that can request Web pages from Web page servers 106 and 114. Additionally, those skilled in the art will understand that a "Web page" refers to a collection of different things, including, for example, visual content displayed on a screen (e.g., text, picture, video, buttons, etc.), software code causing the visual content to be displayed, as well as other software code that do not cause anything to be displayed but perform certain functionality in connection with the Web page.

In the Internet marketplace infrastructure 100 of FIG. 1, users at their computers 108 may access publisher Web pages in the Publisher Web page server 106 but, for any number of reasons, may not visit advertiser Web pages in the Advertiser Web page servers 114. For example, users may not know that the advertiser Web pages exist and/or may not be aware of commerce or entertainment opportunities at these advertiser Web pages. In order to introduce potential consumers to these advertiser Web pages, electronic ads may be placed in the publisher Web pages of the Publisher Web page server 106 to inform users about advertiser Web pages and/or their merchandise/content. The electronic ads can include different types of ads, including banner ads or pop-up ads, and can include different types of content, such as text, images, graphics, video, audio, animation, and/or combinations thereof.

In accordance with one aspect of the disclosed technology, electronic ads for display in Web pages can be stored in and managed by the Ad server 110. An example of an Ad server is LinkShare™ Lightning. In another embodiment, the electronic ads can be stored by another computer, such as the Advertiser Web page server 114.

Figure 2:
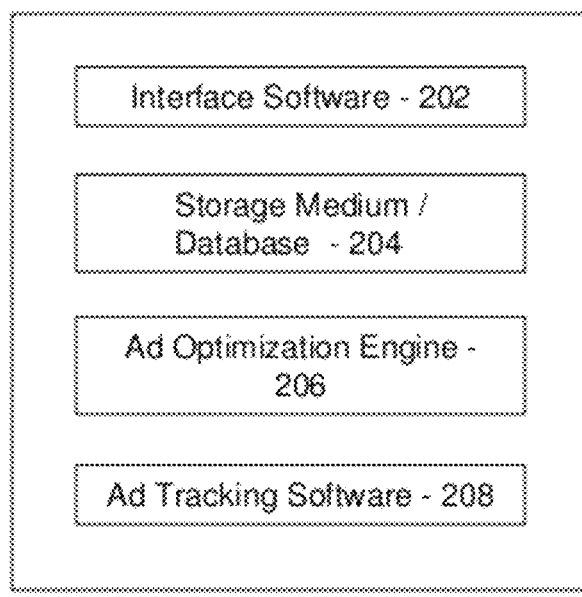
FIG. 2 is a block diagram of exemplary components in the ad server of FIG. 1, in accordance with one embodiment of the disclosed technology.

Referring also to FIG. 2, there is shown a block diagram of exemplary components in the Ad server 110 of FIG. 1. In the illustrated embodiment, the Ad server 110 includes interface software 202 that communicates with one or more publisher computers and advertiser computers, a storage medium/database 204 that stores electronic ads and information about advertisers and publishers, Ad optimization engine 206 that determines which ads to send to which publisher Web page, and Ad tracking software 208 that tracks ad impressions and/or number of clicks per ad and/or sales associated with displayed ads.

The interface software 202 in the Ad server 110 handles communications with one or more publisher computers 112 and advertiser computers 104. In one embodiment, the Ad server 110 includes Web server software that allows advertiser computers 104 and publisher computers 112 to connect to the Ad server 110 using a Web browser. In one embodiment, the Ad server 110 and the publisher computer 112 and advertiser computer 104 can communicate using software specifically designed for their communication, rather than using a Web browser.

In one aspect of the disclosed technology, an advertiser computer 104 can communicate with the Ad server 110 to manage its relationships with publishers and to manage its electronic ads. In one embodiment, the Ad server 110 can maintain an advertiser profile for each advertiser communicating with it. The advertiser profile can include, for example, an advertiser's contact information and financial account information. In one embodiment, the Ad server can offer different tiers of advertisement services, and the advertiser profile can specify which services are enabled or disabled for the advertiser. One service, which will be described later herein in detail, will be referred to as "Lightning." Using Lightning, the Ad server 110 provides particular electronic ads that have been selected by the ad optimization engine 206, in one embodiment, to a Web page. In another embodiment, the advertisement may be provided to other than a Web page, such as an application connected to the World Wide Web, Internet, or an Intranet. In the preferred embodiment, selecting the Lightning service will also "greenlight" an advertiser's ads to be placed on any publisher's Web page. In a preferred embodiment, this is an opt-out system in which the advertiser may place publishers which they do not want to affiliate with on a "blacklist" Optionally, the blacklist feature can include categories of publishers to be blocked, such as adult content providers. This blacklist feature, in one embodiment, will be available through a browser toolbar button, giving advertisers the ability to block publishers and/or categories of publishers by clicking a single button when viewing the Web site or category of Web site to be blocked. In another embodiment, publishers and/or categories of publishers may be added to an advertiser's blacklist via a Web page, such as Ad server 110 Web site discussed below.

In one aspect of the disclosed technology, an advertiser computer can communicate electronic ads to the Ad server 110 to be stored therein. In one example, an electronic advertisement can display a product image and a product price, and can include a selectable link to a merchant Web page where the advertised product can be purchased.

Figure 3:
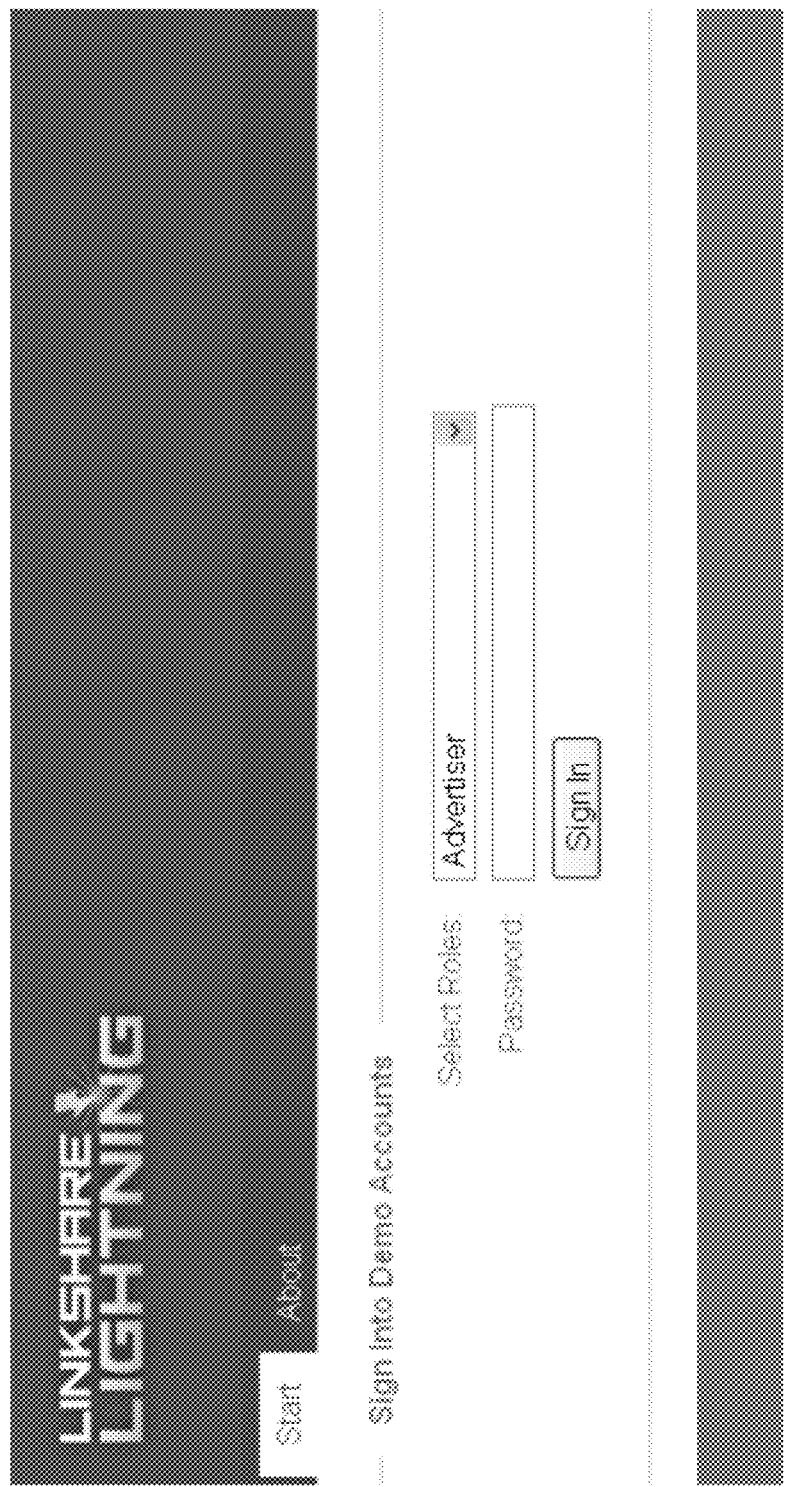

An advertiser wishing to advertise can access the Ad server 110 Web site. In a preferred embodiment, the advertiser is required to log into the Web site, as shown in FIG. 3, or create an account if he or she does not have one. After logging into the Web site, the advertiser can specify a target monthly budget, which is the amount the advertiser wishes to spend on advertising per month. Alternatively, the time period for the budget can be any period of time, such as weekly or yearly. The advertiser can also specify a target average commission to be paid to the publishers. Furthermore, the advertiser can optionally indicate whether sales or click-through rates (CTR) are more important to them, and the ad optimization engine 206 will select the most appropriate ads accordingly. CTR is the total number of clicks divided by the total number of impressions.

For example, a widget merchant may be an advertiser wishing to spend $1,000 on advertising per month, at an average commission rate of 5%. Thus, once the advertiser's $1,000 is spent that month, he will have earned $20,000 in widget sales based on the ads. This system therefore allows an advertiser to know his or her Return on Investment (ROI) in advance. Optionally, the target budgets and target average commissions may be specified for different categories of products. In a preferred embodiment, the user need not make an immediate purchase for the publisher to obtain credit for a sale. For example, a user clicks on an advertisement for a widget and one week later comes back to the same merchant and buys the widget, and the publisher is given a commission for the sale even though the user clicked on the advertisement one week earlier. Such a feature can be implemented through the use of cookies, for example. Both the target budget and the target commissions may not be precisely met by the system because of this lag period where some users delay a purchase. For example, a system having a 30-day window in which credit is given to the publisher may result in one or more users purchasing an advertised product after the budget has been met. In a preferred embodiment, the system will stop displaying ads or reduce the number of impressions after a certain threshold percentage of the budget has been reached. For example, the system may stop displaying an advertiser's ads after 95% of the advertiser's budget has been reached. The threshold may be predefined or may be dynamic, for example, based on data from previous months.

Figure 4:
Figure 6:
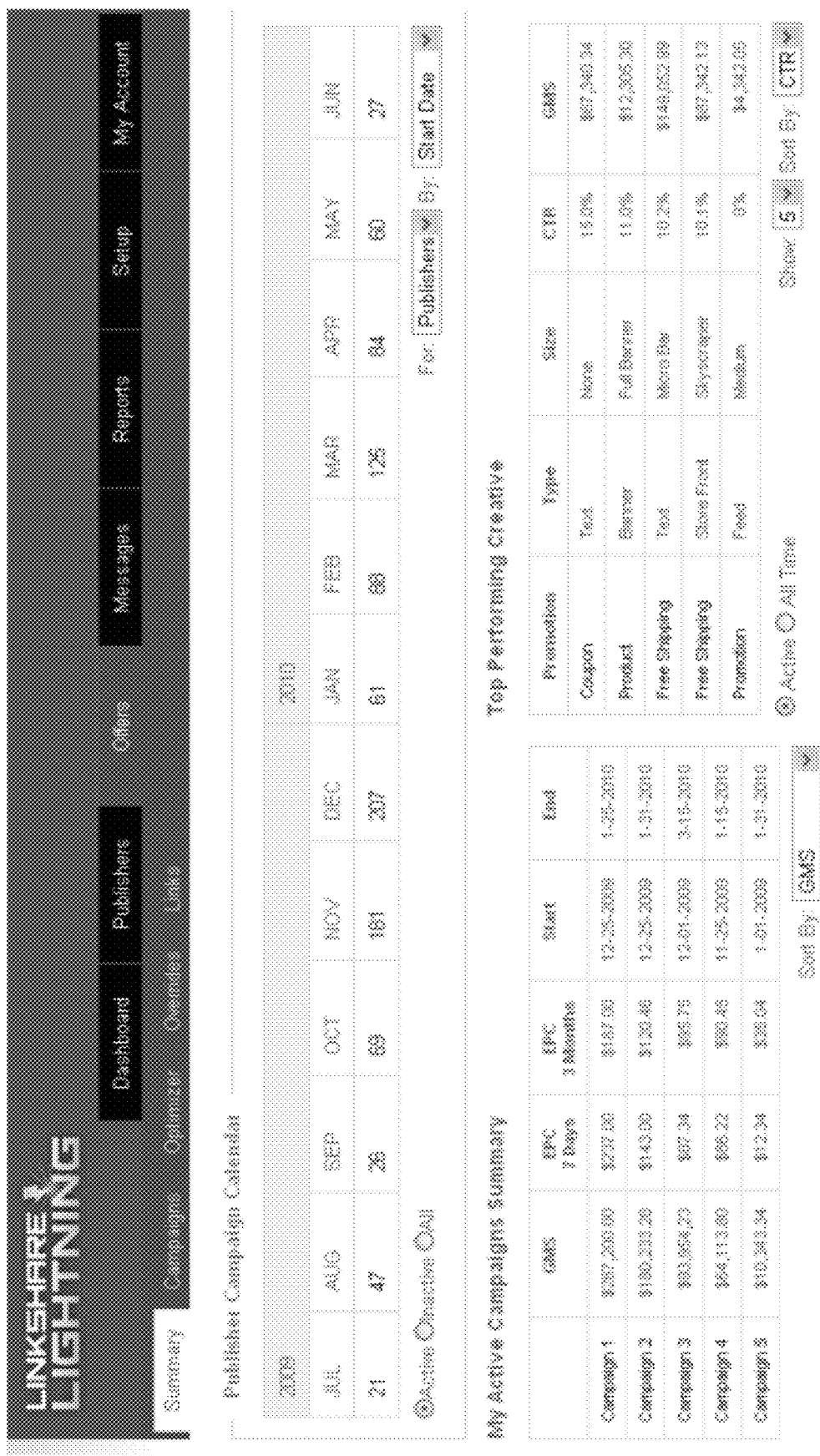
Figure 7:

Features of an embodiment of the Ad server 110 Web site will be further described with reference to the drawings. Upon signing into the Web site, the advertiser will be presented with a dashboard, as shown in FIG. 4. This dashboard will provide an overview of the advertiser's campaigns. For example, a graph of the advertiser's gross merchandise sales (GMS) is displayed, which includes actual amounts from previous months, the present amount, and forecasted amounts for upcoming months. The quick stats graph, shown in FIG. 5, displays the number of impressions, number of clicks, number of transactions, number of unique publishers, gross sales, gross commissions, number of publishers, and active offers. These statistics can be displayed for different time periods by selecting from a dropdown menu. The offers summary, shown in FIG. 6, displays the number of campaigns per month, summaries of the active campaigns, including GMS and EPC statistics, and the top performing creatives. The top performing creatives chart includes the type of promotion (such as coupon, product, free shipping), type of creative (such as text, banner, feed, video), the size of the creative, the CTR, and the GMS. The system can also recommend to advertisers, as shown in FIG. 7, which publishers to use. FIG. 7 shows a chart of recommended publishers including the number of relationships they have, the number of monthly visitors the publishers receives, the demographics of those visitors, and the publisher Web page's category (such as electronics, computer, entertainment, etc).

In one aspect of the disclosed technology, a publisher computer 112 can communicate with the Ad server 110 to manage its advertisement services and relationships with advertisers. In one embodiment, the Ad server 110 can maintain a publisher profile for each publisher communicating with it. The publisher profile can include, for example, a publisher's contact information and financial account information. In one embodiment, the Ad server 110 can offer different tiers of advertisement services, and the publisher profile can specify which services are enabled or disabled for the publisher. In one embodiment, a publisher profile can indicate whether Lightning is enabled or disabled for the publisher. In the preferred embodiment, selecting the Lightning service will also "greenlight" any participating advertiser's ads to be placed on the publisher's Web page. In a preferred embodiment, this is an opt-out system in which the publisher may place advertisers which they do not want to affiliate with on a "blacklist." Optionally, the blacklist feature can include categories of advertisers or advertisements to be blocked, such as adult content. This blacklist feature, in one embodiment, will be available through a browser toolbar button, giving publishers the ability to block advertisers/advertisements and/or categories of advertisers/ advertisements by clicking a single button when viewing the Web site/advertisement or category of Web site/advertisement to be blocked. In another embodiment, advertisers/ advertisements and/or categories of advertisers/advertisements may be added to a publisher's blacklist via a Web page, such as Ad server 110 Web site.

In one aspect of the disclosed technology, a publisher computer can communicate with the Ad server 110 to initialize and configure Lightning for the publisher's Web pages. Using Lightning, the Ad server 110 provides particular electronic ads to a Web page selected by the ad optimization engine 206, discussed in further detail below. The publisher can incorporate code that enables Lightning into the publisher's Web pages. In a preferred embodiment, the code is generated by the Ad server 110 so that the publisher can just copy and paste the code into his or her Web page source code. When a user computer accesses Web page source code from a Web page server and loads the ad optimization engine code into its Web browser, the software code will execute on the user computer and set up an advertisement area, as well as cause the user computer to communicate with the interface software 202 in the Ad server 110 to request an electronic ad.

Figure 8:
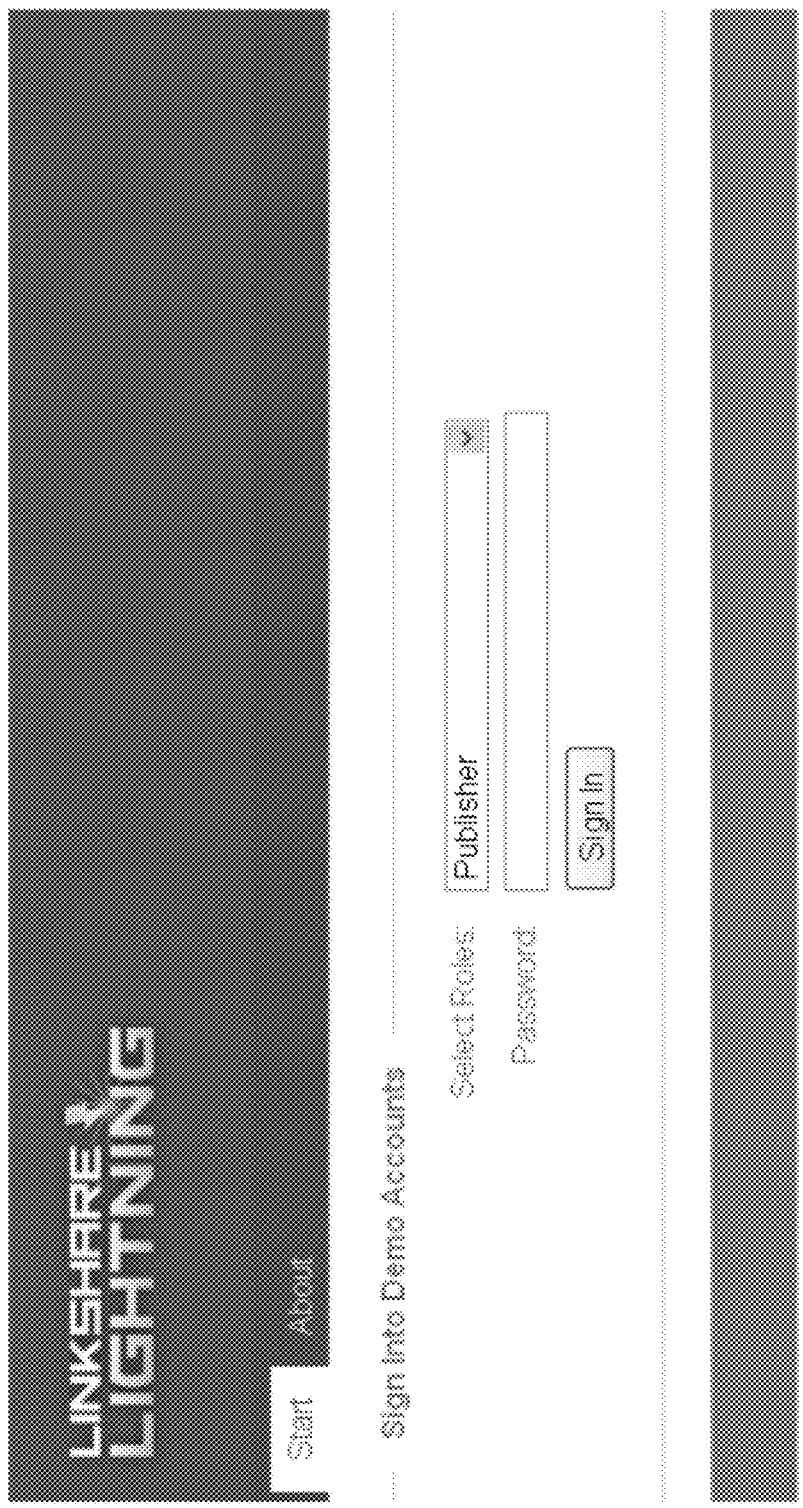

A publisher wishing to advertise on his or her Web page can access the Ad server 110 Web site. In a preferred embodiment, the publisher is required to log into the Web site, as shown in FIG. 8, or create an account if he or she does not have one. After logging into the Web site the publisher can indicate that they have one or more advertisement units (locations on their Web page available for ads) available. Optionally, the publisher may specify the shape and size of the advertisement unit, and/or the types of advertisement they would like to display, such as text, image or video. The system will then be free to display whatever advertisement it decides is suitable, as long as it conforms to the publisher's requirements (such as size or text/image based). Since the system is opt-out, as described above, the publisher need not go through the tedious process of choosing which ads would be best to display on his or her Web pages, and attempting to get approval to display those ads.

Unlike prior art systems, in a preferred embodiment of the present system, different publishers are paid different commission rates for the same advertisement, depending on the amount of sales they generate. The commission rates may be based on the projected amount of sales or using actual data. Thus, publishers who generate more sales for an advertiser will get larger commissions. Accordingly, publishers may not know ahead of time the commission rate they will get for any particular advertisement. Further, the variable commission rates are calculated by the optimization engine, and thus, advertisers and publishers need not bargain commission rates ahead of time. In one embodiment, a publisher can specify a minimum commission rate. For example, if the publisher indicates a minimum commission rate of 3%, then no ads will be published on their Web page unless it provides a commission of 3% or higher.

Even though a small blog Web site, for example, would receive a lower commission rate than a larger Web site that generated more traffic/sales, they would still have incentive to use this system since the optimization engine will display ads that are more likely to convert into a sale. For example, smallblog.com may only receive 2% commission due to their low volume of sales generation; however, this would be preferable for smallblog.com to another system which may provide an 8% commission, but which does not include an optimization system for placing ads that are statistically more likely to convert into a sale.

Optionally, the system may provide to the publisher, based on projected figures or past performances, an estimate of the commission that will be generated for the publisher.

Figure 9:
Figure 11:
Figure 12:
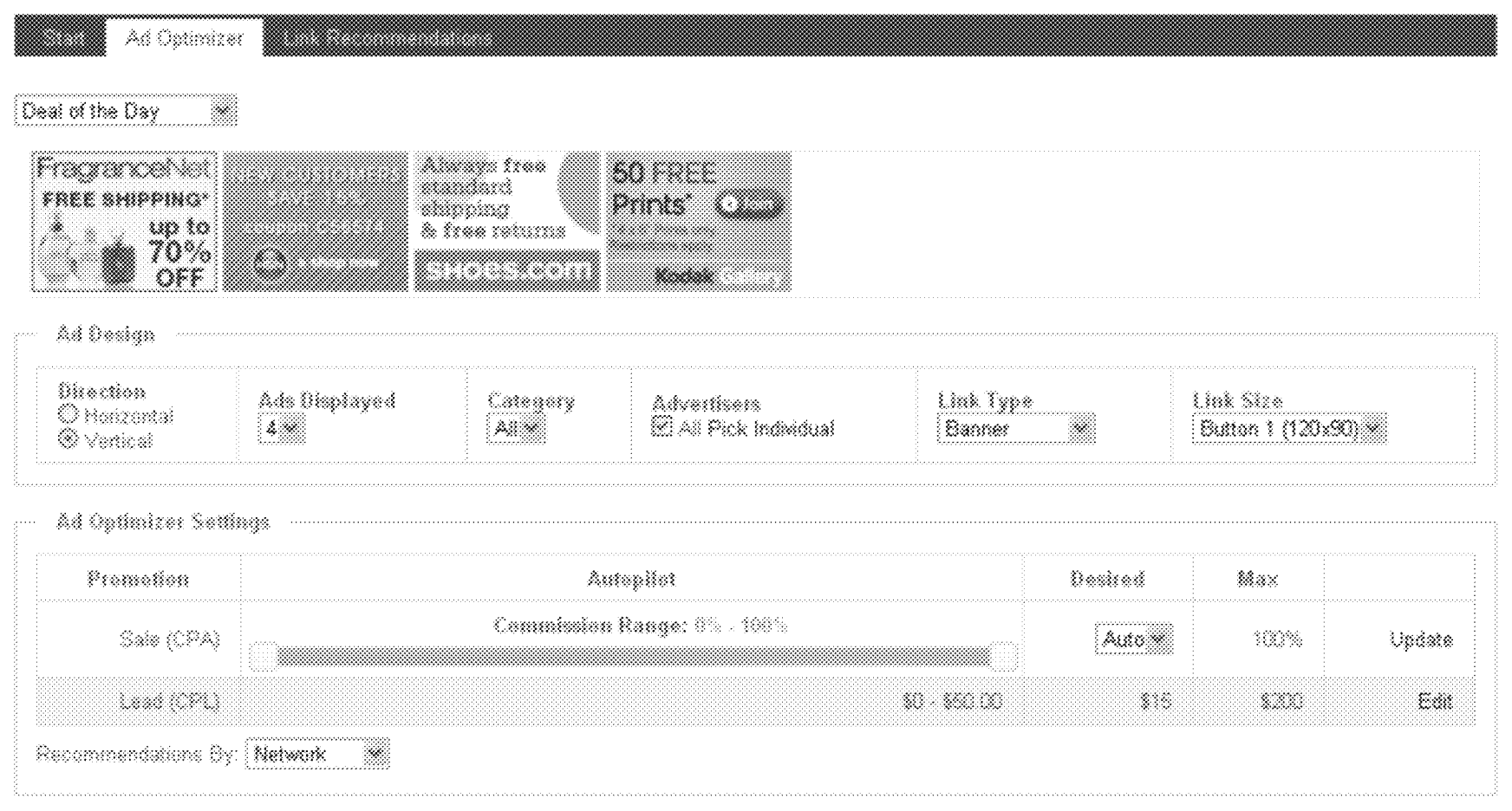

Features of an embodiment of the Ad server 110 Web site will be further described with reference to the drawings. Upon signing into the Web site, the publisher will be presented with a dashboard, as shown in FIG. 9. This dashboard will provide an overview of the publisher's performance. For example, a graph of the publisher's daily commission is displayed, which includes actual amounts from previous days, and the current amount from the present day. The quick stats graph, shown in FIG. 10, displays the number of impressions, number of clicks, number of transactions, gross sales, gross commission, and active offers. These statistics can be displayed for different time periods by selecting from a dropdown menu. The ad performance chart, shown in FIG. 11, displays the statistics of each of ad displayed on the publisher's Web pages. These statistics include the number of impressions, clicks, orders, sales, commissions, CTR, conversion, and effective commission. The ad optimizer settings, shown in FIG. 12, allow the publisher to customize the ad optimizer. The publisher may leave the ad optimizer in fully automatic mode, as shown in FIG. 12, or may specify a desired commissions range (minimum and maximum commission rates).

Figure 13:
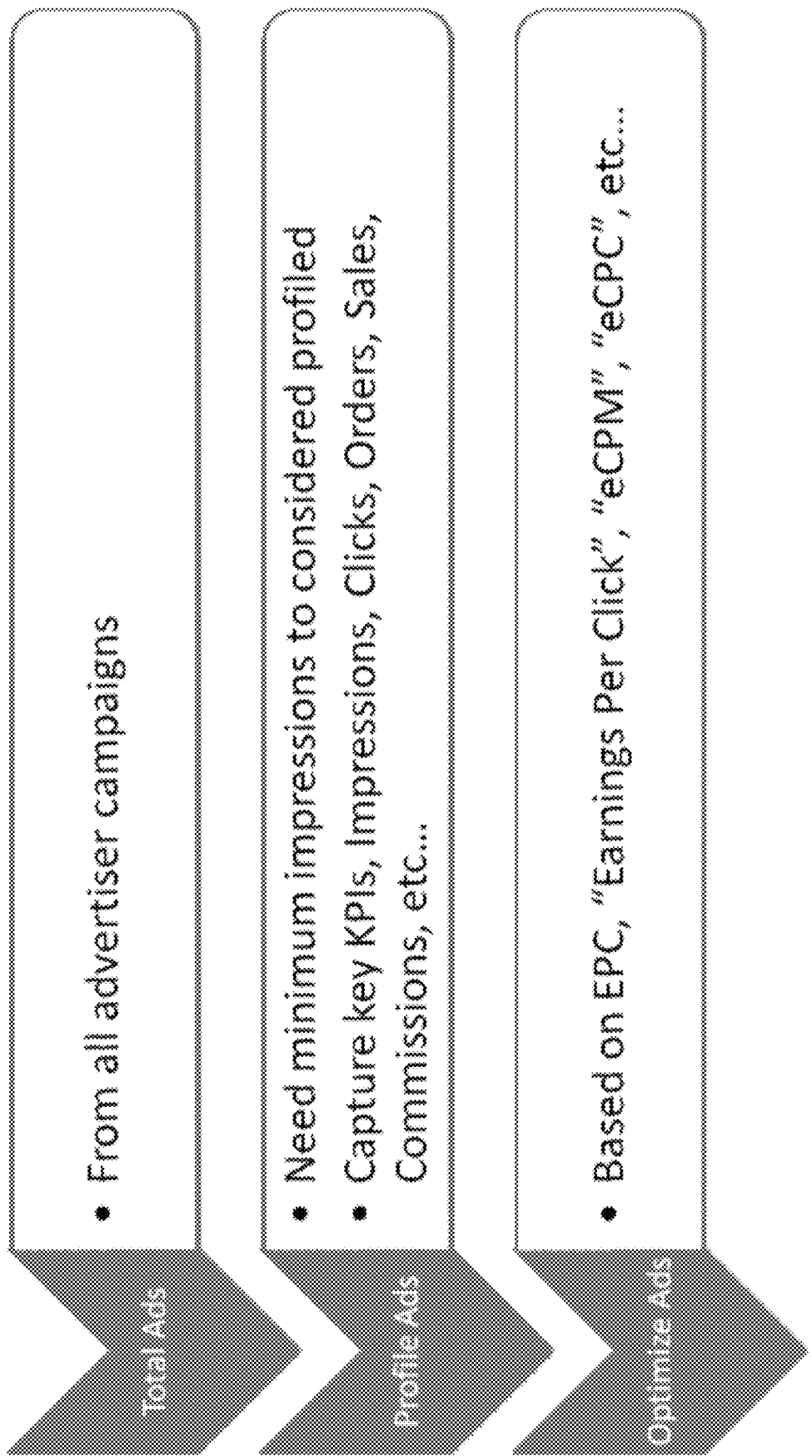
FIG. 13 is flow chart illustrating a high level overview of the ad optimization process, in accordance with one embodiment of the disclosed technology.
Figure 14:
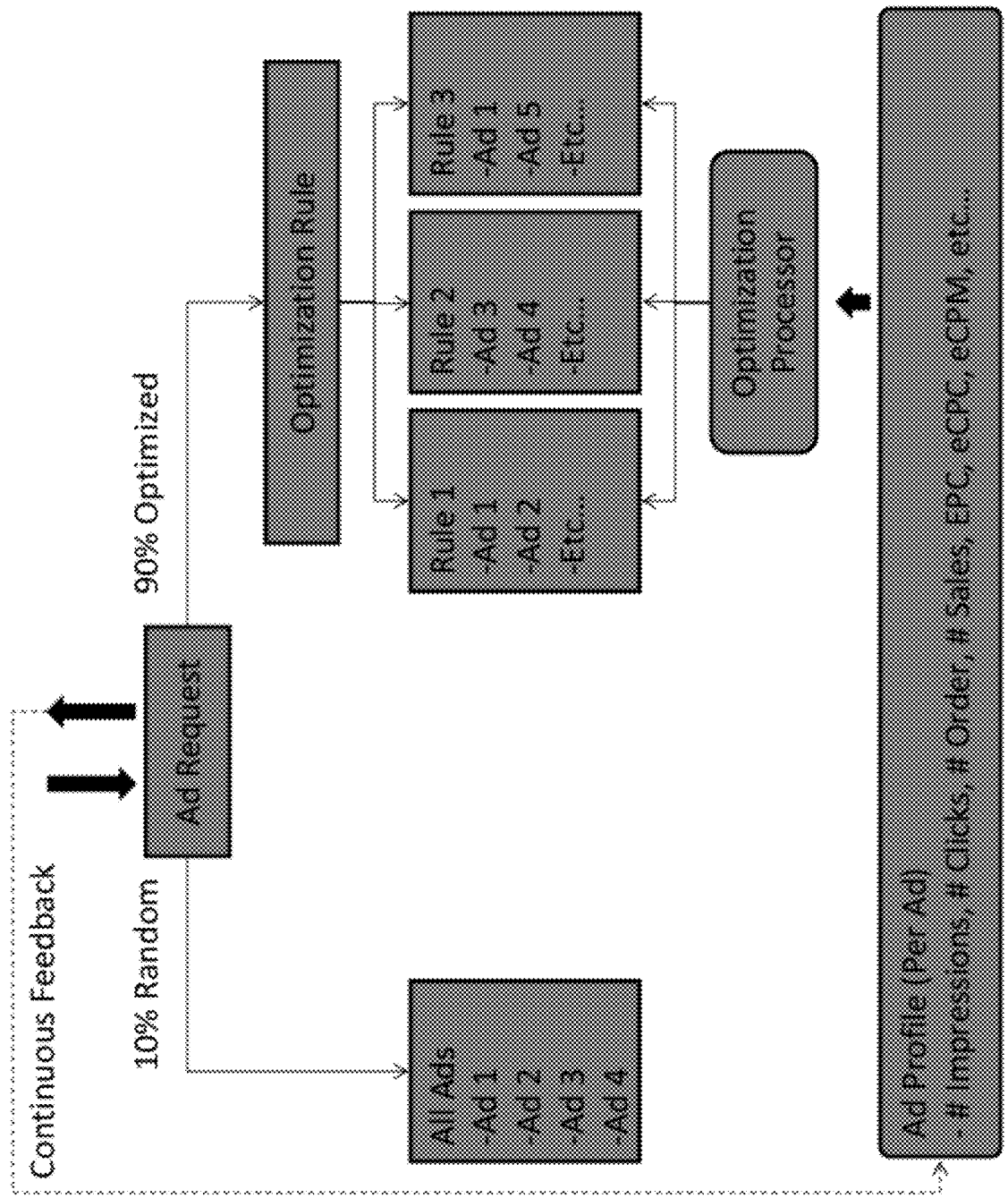
FIG. 14 is flow chart illustrating a detailed overview of the ad optimization process, in accordance with one embodiment of the disclosed technology.

Aspects of the ad optimization engine 206 in the Ad server 110 will now be described with reference to FIGS. 13-14. A high level overview of the ad optimization engine 206's process is shown in FIG. 13. Ads are received from advertisers. Ads are then displayed and profiled, by capturing performance metrics (impressions, clicks, orders, sales, commission, etc). Then, optimal ads are chosen to be displayed by the optimization engine 206. FIG. 14 provides a more detailed flow chart of the optimization process, which will be discussed in further detail below.

The ad optimization engine 206 can optionally optimize for one or more of: advertisers, publishers, and Ad Server 110 (Ad Clearinghouse). The optimization maximizes CTR or sales for advertisers (depending on their preference), maximizes commissions for publishers, and maximizes fees/commission to the Ad server 110. In a preferred embodiment, the ad optimization engine 206 optimizes by maximizing the following formula: Maximum value=X*S+Y*C+Z*F; where S=Sales for Advertiser; C=Commissions for Publishers; F=Network Fees for Company; and X, Y, Z are constant values that are set by the algorithm, where X, Y, Z represents the relative importance of the Sales Amount, Commissions Amount and Network Fees Amount, and X+Y+Z=100%.

The fees paid to the Ad server 110, in a preferred embodiment, are not included in the monthly budget described above. In a further preferred embodiment, the fees paid to the Ad server 110 are based on a percentage of the total sales generated by the system.

In a preferred embodiment, the system will randomly send a statistically significant number of impressions, for example 10,000, for each advertisement in an inventory of ads. The inventory of ads can be any group of ads. The system will track the actions generated from each impression of each advertisement, such as the number of clicks, the number of ads that result in a sale (conversions), and the revenue/profit generated by each sale. Using one or more of these statistics, the system's optimization engine can optionally calculate an advertisement score, with higher CTR and higher conversion rates resulting in a higher advertisement score. In a preferred embodiment, those ads with a higher advertisement score will be displayed more often than those with a lower score.

Optionally, a secondary algorithm may take into account secondary variables. These variables can include, for example, where an advertisement was located on a Web page, what product was advertised, time of impression, size of advertisement, etc.

In one embodiment, ads may be scored and ranked by "most popular": CTR (total clicks divided by total impressions). Optionally, this value can be affected by other variables such as clicks or impressions over the last 7 days, or last 30 days. Optionally, these scores may ranked by marketing channels, or campaign type. In another embodiment, ads may be scored and ranked by "best performing": sales per click (total sales divided by total clicks)+commissions per click (total commission divided by total clicks). Optionally, this value may be affected by other variables such as total sales, total clicks, or total commission over the last 7 days, or last 30 days. Optionally, these scores may be ranked by marketing channels, or campaign type.

In a preferred embodiment, advertisers report purchases associated with a click-through immediately. This allows the system to dynamically optimize advertising in real time. For example, if a particularly popular sale is taking place, the system can quickly push out a high volume of the ads relating to that sale. In yet another embodiment, ads may be scored and ranked based on "real time momentum": ads associated with SKUs with the highest number of sales over a short period will be served more frequently. In yet another embodiment, the system will include "product attribute analysis," which allows the system to serve ads with similar attributes to a product or set of products that are popular or have high real time momentum. Attributes could include, for example, the category of the product, price range of the product, region the product is sold, or specific characteristics of the product. For example, if the system determines, based on SKU information, that an outdoor product is being sold at a high rate during the last 24 hours in the North East U.S., the system will serve other ads associated with outdoor products at a higher rate in the North East U.S. To continue the example, the product with the sudden increase in sales is a winter jacket, and the reason for this increase in sales is the breaking news that a blizzard is approaching. Thus, without any specific external information, the system can automatically capitalize on emerging trends, and do so on a real-time or near real-time basis.

Figure 15:
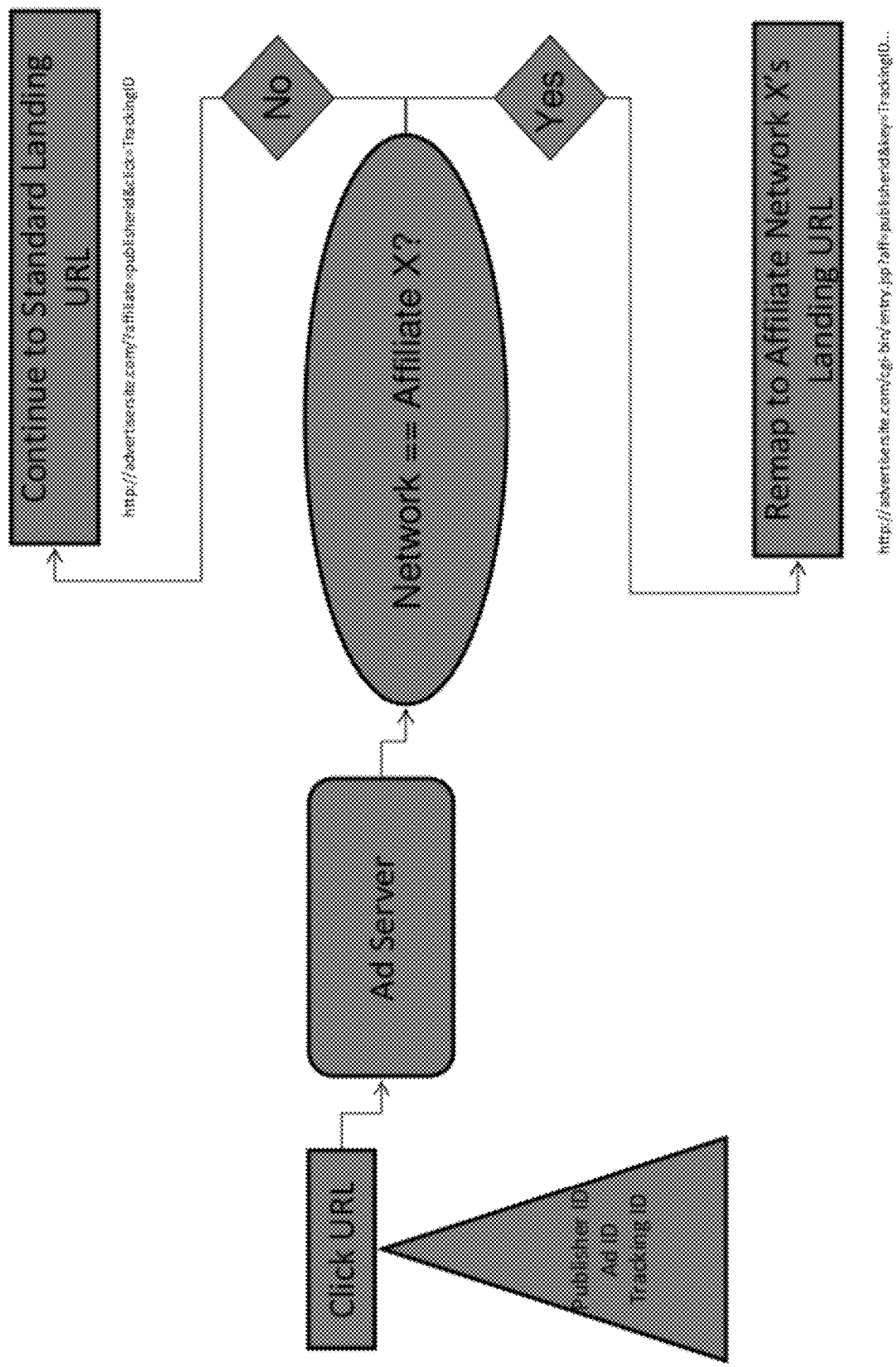
FIG. 15 is a flow chart illustrating URL remapping, in accordance with one embodiment of the disclosed technology.

FIG. 15 is a flow chart illustrating the process for URL remapping in accordance with a preferred embodiment of the system. URL remapping is used to reformat links from one affiliate network to the Ad server 110's network with little or no effort required by the advertiser.

In one aspect of the disclosed technology, the Ad server 110 has access to information regarding an advertisement's "performance," which can include measures such as how often or how frequently a click of an advertisement leads to a sale, or how large the sale is in monetary terms once it occurs, or how frequently an advertisement is clicked once it is displayed, or other measures of an advertisement's performance that will be recognized by those skilled in the art. This information can be provided by transaction tracking technology, such as those described in U.S. Pat. Nos. 5,991,740, 7,778,877, and/or 7,747,476, and/or U.S. patent application Ser. Nos. 12/254,809, and/or 09/771,135, each of which are hereby incorporated by reference in their entirety. One skilled in the art will understand that the means of tracking described by the references above are simply some examples of many well-known means of tracking in the art, and other such tracking means may be used in conjunction with the present system and method.

In a preferred embodiment, the system also provides tracking data for publishers, such as which ads were clicked, which page they originated from they originated from, etc. Presently, larger publishers are able to carry out such tracking themselves, but now smaller publishers can utilize this information as well without their own tracking system.

Various embodiments of the disclosed technology have been described herein for providing to a Web page electronic ads selected by an advertisement optimization engine. The embodiments should not be considered to be mutually exclusive. It is contemplated that various embodiments can be combined.

For ease of exposition, not every step or element of the present invention is described herein as part of software or computer system, but those skilled in the art will recognize that each step or element may have a corresponding computer system or software component. Such computer system and/or software components are therefore enabled by describing their corresponding steps or elements (that is, their functionality), and are within the scope of the present invention.

It will be appreciated that the present invention has been described by way of example only, and that the invention is not to be limited by the specific embodiments described herein. Improvements and modifications may be made to the invention without departing from the scope or spirit thereof.

What is claimed:

1. A computer-implemented method for managing electronic advertising, the method comprising:
providing, by a processor on an advertisement server, an advertiser graphical user interface and a publisher graphical user interface launchable in web browsers that allow advertiser computing devices of a plurality of advertisers and publisher computing devices of a plurality of publishers to communicate with the advertisement server;
maintaining, by the processor on the advertisement server, advertiser profiles for the plurality of advertisers communicating with the advertisement server, each advertiser profile being associated with one of the advertisers, each advertiser profile specifying whether its associated advertiser authorizes the advertisement server to automatically placing an advertisement of the associated advertiser in a web of one or more selected publishers chosen from the plurality of publishers;

maintaining, by the processor on the advertisement server, publisher profiles for the plurality of publishers communicating with the advertisement server, each publisher profile being associated with one of the publishers, each publisher profile specifying whether its associated publisher authorizes the advertisement server to automatically place a selected advertisement in a web page of the associated publisher;

displaying, to at least one advertiser of the plurality of advertisers, the advertiser graphical user interface in a web browser of the at least one advertiser's computing device to allow the at least one advertiser to manage its relationships with publishers and to manage its advertisement;

automatically displaying, to the at least one advertiser, in the advertiser graphical user interface, a first dashboard providing an overview of a campaign of the at least one advertiser, the first dashboard including a graph illustrating the at least one advertiser's actual gross merchandise sales, and forecast gross merchandise sales, a list of recommended publishers, and an estimated return on investment, for the at least one advertiser, of the campaign of the at least one advertiser if implemented according to the list of recommended publishers;

receiving, by the processor on the advertisement server, from the at least one advertiser's computing device, via the advertiser graphical user interface, data indicative of the at least one advertiser's advertisement to be published, a target monthly budget, and a target average commission rate in connection with the advertisement;

receiving, from an opt-out system, a blacklist of publishers blocked by the at least one advertiser, where the at least one advertiser can add a new publisher to the blacklist of publishers by clicking a browser toolbar button displayed in the web browser of the at least one advertiser's computing device when viewing a web page of the new publisher;

displaying, to a first publisher and a second publisher, the publisher graphical user interface in a web browser to allow each of the first and second publishers to communicate with the advertisement server to manage its advertisement services and relationships with the plurality of advertisers;

automatically displaying, to each of the first and second publishers, in the publisher graphical user interface, a second dashboard providing an overview of their respective performances, the second dashboard including a graph of their respective daily commissions and statistics of each advertisement displayed on their respective web pages;

receiving, from the opt-out system, a blacklist of advertisers blocked by each of the first and second publishers, where at least one of the first and second publishers can add a new advertiser to the blacklist of advertisers by clicking a browser toolbar button when viewing a web page of the new advertiser;

displaying, to each of the first and second publishers, in the publisher graphical user interface, a scroll bar for configuring their respective ranges of acceptable cost per action commission rates defined by a minimum cost per action commission rate and a maximum cost per action commission rate, the scroll bar having a first slider movable along the scroll bar for defining the minimum cost per action commission rate, the scroll bar having a second slider movable along the scroll bar for defining the maximum cost per action commission rate;

receiving, by the processor on the advertisement server, data indicative of advertisement space availability of the first publisher and the first publisher's range of acceptable cost per action commission rates via the first publisher's graphical user interface;

receiving, by the processor on the advertisement server, data indicative of advertisement space availability of the second publisher and the second publisher's range of acceptable cost per action commission rates via the second publisher's graphical user interface;

automatically tracking, by the processor on the advertisement server, the first publisher's sales;

automatically tracking, by the processor on the advertisement server, the second publisher's sales;

calculating, by the processor on the advertisement server, a first commission rate for the first publisher based on the first publisher's sales, the first commission rate being a percentage value, the first commission rate satisfying the first publisher's minimum cost per action commission rate;

calculating, by the processor on the advertisement server, a second commission rate for the second publisher based on the second publisher's sales, the second commission rate being a percentage value, the second publisher's sales greater than the first publisher's sales, and the second commission rate greater than the first commission rate, the second commission rate satisfying the second publisher's minimum cost per action commission rate;

automatically publishing the at least one advertiser's advertisement according to the advertiser profile of the at least one advertiser and the publisher profiles of the first publisher and the second publisher by:

comparing, by the processor on the advertisement server, the target average commission rate to the range of acceptable cost per action commission rates of each of the first publisher and the second publisher;

determining, by the processor on the advertisement server, that the at least one advertiser is not on the first publisher's blacklist of advertisers and the second publisher's blacklist of advertisers;

determining, by the processor on the advertisement server, that the first and second publishers are not on the at least one advertiser's blacklist of publishers;

automatically transmitting, by the processor on the advertisement server, the at least one advertiser's advertisement to display in a web page of the first publisher when the target average commission rate does not fall beyond the first publisher's range of acceptable cost per action commission rates;

automatically transmitting, by the processor on the advertisement server, the at least one advertiser's advertisement to display in a web page of the second publisher when the target average commission rate does not fall beyond the second publisher's range of acceptable cost per action commission rates; and automatically stopping the display of the at least one advertiser's advertisement when a predetermined percentage of the at least one advertiser's target monthly budget is reached.

2. The computer-implemented method of claim 1, further comprising receiving target budgets and/or average commission rates for at least two different categories of products.

3. The computer-implemented method of claim 1 further comprising:
   receiving from each of the first and second publishers their respective requirement for advertisements that may be displayed in their respective web pages;
   wherein said requirements relates to at least one of advertisement dimensions and advertisement type, said advertisement type including at least two of: text, image, and video.

4. The computer-implemented method of claim 1, further comprising specifying, by each publisher, a minimum commission rate.

5. The computer-implemented method of claim 1, further comprising calculating, based on projected figures or past performances, an estimate of fees that will be generated for each of the first and second publishers.

6. A system for managing electronic advertising, comprising:
   at least one advertisement server, connected to a communication network, comprising executable programming contained on a non-transitory storage medium, said programming when executed operable to:
      provide an advertiser graphical user interface and a publisher graphical user interface launchable in web browsers that allow advertiser computing devices of a plurality of advertisers and publisher computing devices of a plurality of publishers to communicate with the advertisement server;
      maintaining advertiser profiles for the plurality of advertisers communicating with the advertisement server, each advertiser profile being associated with one of the plurality of advertisers, each advertiser profile specifying whether its associated advertiser authorizes the advertisement server to automatically placing an advertisement of the associated advertiser in a web page of one or more selected publishers chosen from the plurality of publishers;
      maintaining publisher profiles for the plurality of publishers communicating with the advertisement server, each publisher profile being associated with one of the publishers, each publisher profile specifying whether its associated publisher authorizes the advertisement server to automatically place a selected advertisement in a web page of the associated publisher;
   display, to at least one advertiser of the plurality of advertisers, the advertiser graphical user interface in a web browser of the at least one advertiser's computing device to allow the at least one advertiser to manage its relationships with publishers and to manage its advertisement;
   automatically display, to the at least one advertiser, in the advertiser graphical user interface, a first dashboard providing an overview of a campaign of the at least one advertiser, the first dashboard including a graph illustrating the at least one advertiser's actual gross merchandise sales, and forecast gross merchandise sales, a list of recommended publishers, and an estimated return on investment, for the at least one advertiser, of the campaign of the at least one advertiser if implemented according to the list of recommended publishers;
   receive, from the at least one advertiser's computing device, via the advertiser graphical user interface, data indicative of the at least one advertiser's advertisement to be published, a target monthly budget, and a target average commission rate in connection with the advertisement;
   receive, from an opt-out system, a blacklist of publishers blocked by the at least one advertiser, where the at least one advertiser can add a new publisher to the blacklist of publishers by clicking a browser toolbar button displayed in the web browser of the at least one advertiser's computing device when viewing a web page of the new publisher;
   display, to a first publisher and a second publisher, the publisher graphical user interface in a web browser to allow each of the first and second publishers to communicate with the advertisement server to manage its advertisement services and relationships with the plurality of advertisers;
   automatically display, to each of the first and second publishers, in the publisher graphical user interface, a second dashboard providing an overview of their respective performances, the second dashboard including a graph of their respective daily commissions and statistics of each advertisement displayed on their respective web pages;
   receive, from the opt-out system, a blacklist of advertisers blocked by each of the first and second publishers, where at least one of the first and second publishers can add a new advertiser to the blacklist of advertisers by clicking a browser toolbar button when viewing a web page of the new advertiser;
   display, to each of the first and second publishers, in the publisher graphical user interface, a scroll bar for configuring their respective ranges of acceptable cost per action commission rates defined by a minimum cost per action commission rate and a maximum cost per action commission rate, the scroll bar having a first slider movable along the scroll bar for defining the minimum cost per action commission rate, the scroll bar having a second slider movable along the scroll bar for defining the maximum cost per action commission rate;
   receive data indicative of advertisement space availability of the first publisher and the first publisher's range of acceptable cost per action commission rates via the first publisher's graphical user interface;
   receive data indicative of advertisement space availability of the second publisher and the second publisher's range of acceptable cost per action commission rates via the second publisher's graphical user interface;
   automatically track the first publisher's sales;
   automatically track the second publisher's sales;
   calculate a first commission rate for the first publisher based on the first publisher's sales, the first commission rate being a percentage value, the first commission rate satisfying the first publisher's minimum cost per action commission rate;
   calculate a second commission rate for the second publisher based on the second publisher's sales, the second commission rate being a percentage value, the second publisher's sales greater than the first publisher's sales, and the second commission rate greater than the first commission rate, the second commission rate satisfying the second publisher's minimum cost per action commission rate;
   automatically publish the at least one advertiser's advertisement according to the advertiser profile of the at least one advertiser and the publisher profile of the first publisher and the second publisher by:

comparing the target average commission rate to the range of acceptable cost per action commission rates of each of the first publisher and the second publisher;

determining that the advertiser is not on the first publisher's blacklist of advertisers and the second publisher's blacklist of advertisers;

determining that the first and second publishers are not on the at least one advertiser's blacklist of publishers;

automatically transmitting the at least one advertiser's advertisement to display in a web page of the first publisher when the target average commission rate does not fall beyond the first publisher's range of acceptable cost per action commission rates;

automatically transmitting the at least one advertiser's advertisement to display in a web page of the second publisher when the target average commission rate does not fall beyond the second publisher's range of acceptable cost per action commission rates; and automatically stopping the display of the at least one advertiser's advertisement when a predetermined percentage of the at least one advertiser's target monthly budget is reached.

* * * * *